United States Patent Office 3,578,402
Patented May 11, 1971

3,578,402
METHOD FOR INHIBITING THE FOAMING TENDENCIES OF PHOSPHORIC ACID
Olen L. Riggs, Jr., Ponca City, Okla., assignor to Continental Oil Company, Ponca City, Okla.
No Drawing. Filed Feb. 9, 1968, Ser. No. 704,215
Int. Cl. C01b 25/18
U.S. Cl. 23—165                                      2 Claims

ABSTRACT OF THE DISCLOSURE

The foaming tendencies of phosphoric acid are inhibited by addition thereto of the reaction product of an iodide such as hydrogen iodide and an organic amine such as aliphaticalkyl mono and diamines, imidazolines, and guanidines.

DISCLOSURE

This invention relates to a novel and useful method for inhibiting the foaming tendencies of phosphoric acid.

Phosphoric acid has a tendency to foam when agitated and when present in a system in which corrosion of metallic objects occurs. In an effort to reduce the foaming tendency of phosphoric acid various inhibitors have been employed in the past.

It has now been unexpectedly discovered that the foaming tendency of phosphoric acid can be markedly reduced by adding thereto an effective amount of the material obtained by reacting hydrogen iodide with an organic amine having a molecular weight between about 50 and about 500.

The preferred organic amines which can be reacted with hydrogen iodide to produce the desired reaction product are essentially all aliphaticalkyl mono or diamines, imidazolines, and guanidines, ethoxylated monoamines and ethoxylated diamines. Some specific examples are shown by the following structural formulas:

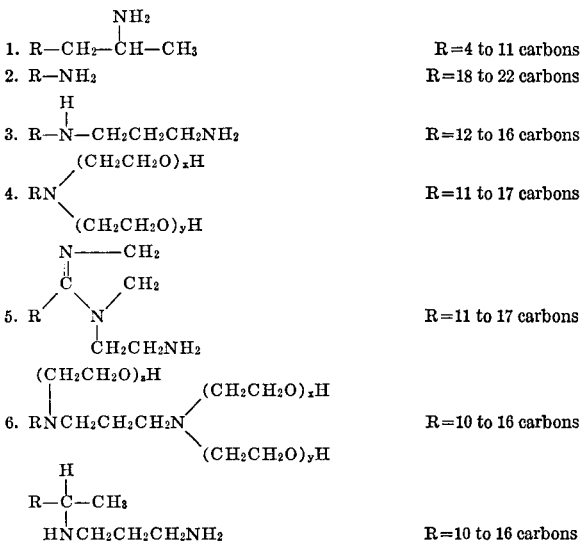

Hydrogen iodide is the preferred iodide containing reactant; however, gaseous $I_2$ or alkyl iodides in acidic solution under controlled temperatures can also be used.

The mole ratio of amine to hydrogen iodide can vary from about 1:3 to about 3:1, with the preferred ratio being 1:1.

The concentration of reaction product effective to give the desired results can vary from about 50 to about 1000 parts per million, with the upper limit being more of an economic limit than a limit on the results produced.

The reaction between the organic amine and the hydrogen iodide is preferably carried out in the presence of isopropanol and at reflux conditions at about 80° C. The amount of alcohol present is not critical but is preferred to be in a quantity which will give the desired concentration of reaction product for addition to the phosphoric acid.

Example 1 shows a procedure which provides the desired reaction product.

EXAMPLE 1

One mole of an organic amine having the structural formula

R=14 carbons was weighed into a three-necked round bottom flask. One hundred fifty grams of isopropanol and one mole of hydrogen iodide were added. The flask was then heated to 80° C. and allowed to reflux for 3 hours. The entire reaction product was then tested as a foam inhibitor for phosphoric acid. The results are shown in Example 2.

EXAMPLE 2

Foaming tests were run on phosphoric acid at 200° F. The phosphoric acid was placed in a flask containing an annealed 1020 carbon steel corrosion test specimen and the system was agitated at 200° F. for 40 minutes. The foaming tendency of the phosphoric acid with various amounts of the product of Example 1 added was observed. The results are shown in the following Table 1.

TABLE 1

Phosphoric acid at 200° F.

| Antifoam agent concentration, p.p.m.: | Percent reduction in foam |
|---|---|
| 0 | 0 |
| 50 | 10 |
| 100 | 40 |
| 200 | 70 |
| 500 | 98 |
| 1000 | 100 |

Table 2 illustrates that the beneficial effect does not occur when the amines and hydrogen iodide are present as in unreacted simple mixture.

TABLE 2

Phosphoric acid at 200° F.

| Sample, unreacted: | Percent reduction in foam |
|---|---|
| Amine of Example 1 (500 p.p.m.)+hydrogen iodide (500 p.p.m.) | 0 |
| Uninhibited | 0 |

Having thus described the invention by providing specific examples thereof, it is to be understood that no undue limitations or restrictions are to be drawn by reason thereof and that many variations and modifications are within the scope of the invention.

What is claimed is:

1. A method of reducing the foaming tendency of phosphoric acid comprising adding to said phosphoric acid between about 50 to about 1000 parts per million of the material obtained from the reaction between hydrogen iodide and an organic amine having a molecular weight between about 50 and about 500 selected from the group consisting of aliphatic monoamines, and aliphatic diamines, and wherein the mole ratio of said amine to said hydrogen iodide is between about 1:3 to about 3:1.

2. The method of claim 1 wherein the mole ratio of hydrogen iodide to said organic amine is 1:1.

References Cited

UNITED STATES PATENTS

| | | | |
|---|---|---|---|
| 2,439,797 | 4/1948 | Denman | 252—321 |
| 3,129,170 | 4/1964 | Ittlinger | 210—54 |
| 3,437,437 | 4/1969 | Dorwart | 23—165 |

FOREIGN PATENTS

| | | | |
|---|---|---|---|
| 736,351 | 9/1955 | Great Britain | 252—321 |

OSCAR R. VERTIZ, Primary Examiner

G. A. HELLER, Assistant Examiner

U.S. Cl. X.R.

252—321, 358